(12) United States Patent
Seki et al.

(10) Patent No.: US 7,748,491 B2
(45) Date of Patent: Jul. 6, 2010

(54) POWER TRANSMISSION STRUCTURE (75) Inventors: Bunzo Seki, Saitama (JP); Tomoaki Yamagata, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 906 days.

(21) Appl. No.: 11/527,390

(22) Filed: Sep. 27, 2006

(65) Prior Publication Data
US 2007/0142162 A1   Jun. 21, 2007

(30) Foreign Application Priority Data
Sep. 30, 2005   (JP)   ............................. 2005-287710

(51) Int. Cl.
B60K 17/00 (2006.01)
B62K 5/00 (2006.01)
(52) U.S. Cl. ..................... 180/357; 180/373; 74/606 R; 384/544; 384/461
(58) Field of Classification Search ................. 180/357, 180/373, 374; 74/606 R, 607; 384/544, 384/461
See application file for complete search history.

(56) References Cited

U.S. PATENT DOCUMENTS

| 3,029,889 | A | * | 4/1962 | Paramythioti | ................ | 180/357 |
| 3,145,582 | A | * | 8/1964 | Wagner | ..................... | 74/606 R |
| 4,271,721 | A | * | 6/1981 | Yamamori et al. | ............. | 475/71 |
| 4,367,661 | A | * | 1/1983 | Moroto et al. | .......... | 74/665 GE |
| 4,719,984 | A | * | 1/1988 | Watanabe | ................... | 180/226 |
| 4,727,768 | A | * | 3/1988 | Hayashi et al. | ............. | 475/206 |
| 4,788,886 | A | * | 12/1988 | Nussbaumer et al. | ...... | 74/665 T |
| 5,590,571 | A | * | 1/1997 | Tsuji | ........................ | 74/606 R |
| 6,095,275 | A | * | 8/2000 | Shaw | ......................... | 180/185 |
| 6,308,588 | B1 | * | 10/2001 | Zubik | ......................... | 74/417 |
| 6,454,040 | B1 | * | 9/2002 | Fukuda | ....................... | 180/374 |
| 6,510,932 | B2 | * | 1/2003 | Ikeda et al. | ................. | 192/54.4 |
| 6,868,932 | B1 | * | 3/2005 | Davis et al. | ................. | 180/292 |
| 6,969,334 | B2 | * | 11/2005 | Schleuder et al. | ........... | 475/213 |
| 2002/0170768 | A1 | * | 11/2002 | Izumi et al. | ................. | 180/374 |

FOREIGN PATENT DOCUMENTS

| JP | 60-249745 | * | 12/1985 |
| JP | 63-90486 | A | 4/1988 |
| JP | 1-190596 | * | 7/1989 |

* cited by examiner

Primary Examiner—Paul N. Dickson
Assistant Examiner—George D. Spisich
(74) Attorney, Agent, or Firm—Birch, Stewart, Kolasch & Birch, LLP (57) ABSTRACT To enhance assembly and maintenance of a rear wheel suspension. Rear wheel axles extend to the left and right from a final case supported on a rear portion of a vehicle body frame, and rear wheels are independently suspended from left and right portions of a vehicle body. On the left and right sides of the final case, the rear wheel axles are connected to a left-side joint and a right-side joint, and the left-side joint is detachably attached to a side surface of the final case by a separate holder fitted with a driven sprocket meshed with a chain. A joint portion shaft of the right-side joint is borne on the final case through a bearing, a brake disk is attached thereto, and the joint portion shafts are spline connected. In assembling or disassembling, the separate holder can be attached and detached through petal-like cutouts formed in the driven sprocket.

14 Claims, 6 Drawing Sheets

POWER TRANSMISSION STRUCTURE

CROSS-REFERENCE TO RELATED APPLICATIONS

This nonprovisional application claims priority under 35 U.S.C. §119(a) on Patent Application No. 2005-287710, filed in Japan on Sep. 30, 2005, the entirety of which is incorporated herein by reference.

BACKGROUND OF THE INVENTION

1. Field of the Invention

The present application relates to a power transmission mechanism in an independent suspension or the like. In particular, the present invention relates to a support structure that is advantageous for outer races that constitute left and right joints.

2. Description of Background Art

A support structure for outer races that constitute left and right joints in an independent suspension, a support structure according to the background art includes a tubular member that is borne by a bearing press fitted in a final case. Joint portion shafts provided in the outer races are inserted from both end sides of the tubular member and are spline connected respectively. (see, for example, Japanese Patent Laid-open No. Sho 63-90486).

Where a driving means is provided on an outer race, a driving force can be efficiently transmitted to the outer race, but the support by a bearing is needed because a great force is exerted on a joint.

In the known structure mentioned above, the bearing is directly press fitted in the final case. With this structure, assembly needs considerable labor, and maintenance needs a number of steps because the final case must be disassembled.

SUMMARY OF THE INVENTION

It is an object of the present application to facilitate assembly and maintenance of such a system. In order to solve the above problems, a first aspect of the present invention is directed to a power transmission structure that includes a transmission system final case supported on a vehicle body frame, and left and right drive wheels supported through left and right suspension arms of the vehicle body frame, the final case provided with left and right joints for transmitting a driving force of an engine to left and right axles. In the power transmission structure, the left and right joints have respective outer races, and one of the outer races is borne by a bearing in the final case, while the other outer race is borne by a bearing provided in a separate holder which can be attached to and detached from the final case.

According to a second aspect of the present invention, the separate holder is detachably attached to the final case by a bolt, at an attaching portion provided integrally therewith.

According to a third aspect of the present invention, one of the left and right outer races is provided with a driven sprocket, the other outer race is provided with a brake disk, and the driven sprocket is provided with a working space through which a fastening portion for detachably attaching the separate holder to the final case is exposed, in the state of being attached to the outer race.

According to a fourth aspect of the present invention, the working space of the driven sprocket is a flower-like punched hole, the number of petal-like portions of the flower-like punched hole is equal to the number of the fastening portions for detachably attaching the separate holder to the final case, and the fastening portions are smaller than the petal-like portions.

According to the first aspect of the present invention, the bearing portions for the outer races in the left and right joints are separated, one of them is provided as one body with the final case, and the other of them is provided as the separate holder. Therefore, the system can be easily assembled by preliminarily separately sub-assembling the left and right outer races and mounting the separate holder onto the final case, so that the system can be easily mass-produced. In addition, since the left and right outer races can be disassembled by dismounting the separate holder, maintenance is also enhanced.

According to the second aspect of the present invention, the separate holder can be detachably mounted onto the final case, at the attaching portion thereof. This ensures easy mounting and excellent mass-production of the power transmission structure.

According to the third aspect of the present invention, one of the left and right outer races is provided with the driven sprocket, the other outer race is provided with the brake disk, and the driven sprocket is provided with the working space through which the attaching portion for detachably attaching the separate holder to the final case is exposed, in the state of being attached to the outer race. Therefore, the separate holder can be easily attached and detached through the working space in the condition where the driven sprocket is kept attached to the outer race, whereby mass-production and maintenance of the system are enhanced.

According to the fourth aspect of the present invention, the number of the petal-like portions of the flower-like punched hole provided in the driven sprocket is equal to the number of the fastening portions of the separate holder, and the fastening portions are smaller than the petal-like portions. Therefore, the separate holder can be attached and detached under the condition where the driven sprocket is kept attached to the outer race.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention will now be described with reference to the accompanying drawings. The same reference numerals will be used to identify the same or similar elements throughout the several views. It should be noted that each of the drawings should be viewed in the direction of orientation of the reference numerals. In addition, the sides (directions) such as the front, rear, left, right and the like in the following description refer to the sides (directions) with respect to the vehicle in use, unless otherwise specified.

Figure 1:
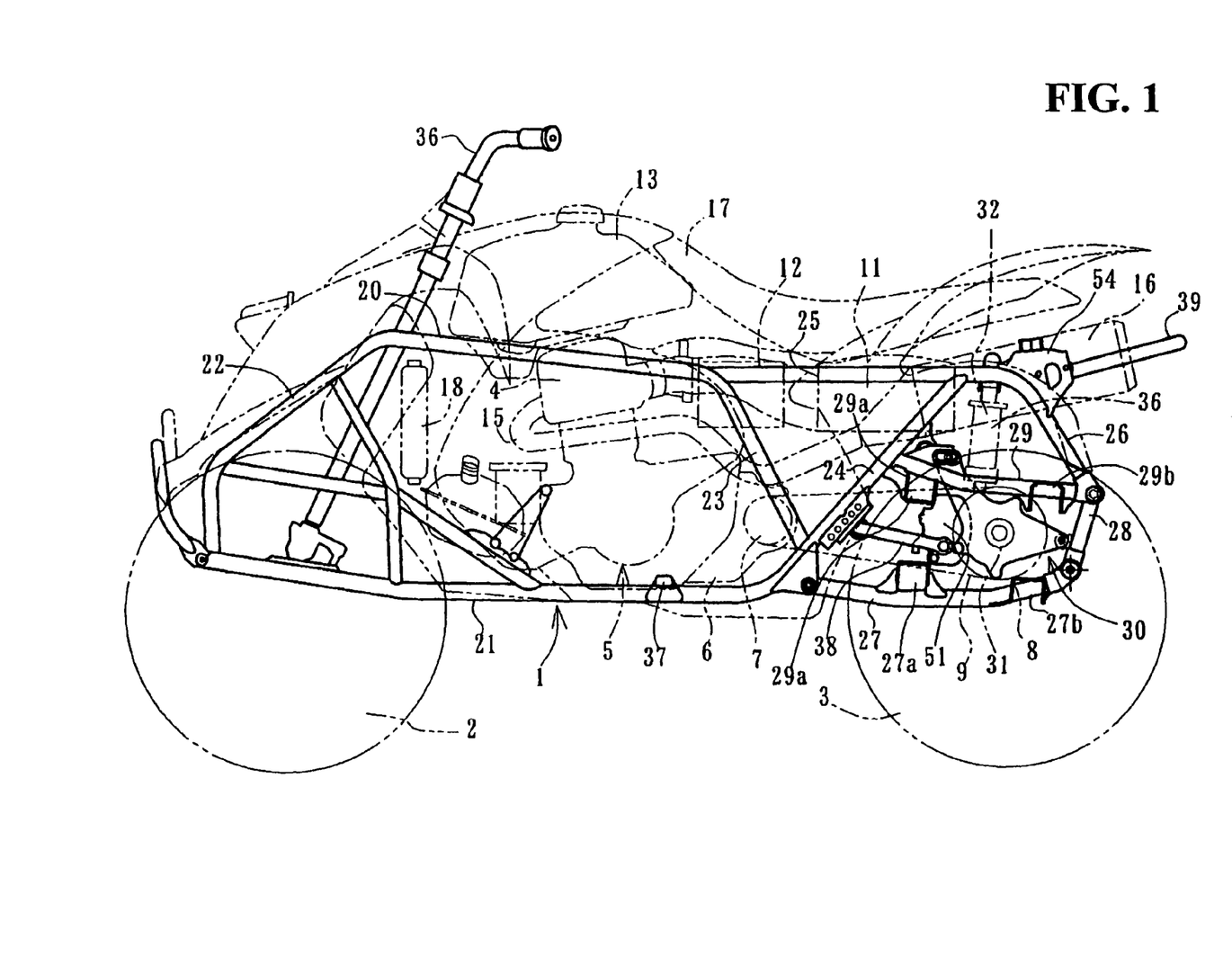
FIG. 1 is a side view of an essential part of a buggy car according to an embodiment of the present invention.

FIG. 1 is a left side view of an essential part of a four-wheel buggy car according to an embodiment of the present invention. The four-wheel buggy car is a saddle ride type all-terrain vehicle, which is provided on the front and rear sides of a vehicle body frame 1 with left-right pairs of front wheels 2 and rear wheels 3, which are low-pressure balloon tires comparatively large in diameter.

An engine 5 having a forwardly inclined cylinder 4 is mounted on the vehicle body frame 1 at a roughly central position thereof. A crankcase 6 constituting a lower portion of the engine 5 functions also as a transmission case. A chain 9 is wrapped around a drive sprocket 7 provided at a rear portion of the crankcase 6 and a driven sprocket 8 on the rear wheel side, whereby the rear wheels 3 are chain driven. The rear wheels 3 are suspended from a rear portion of the vehicle body in a double wishbone system.

A base end portion of an exhaust pipe 15 is connected to a front portion of a cylinder head, and the exhaust pipe 15 extends on a lateral side of a cylinder 4 to be connected to a muffler 16 disposed at a rear portion of the vehicle body. In the figure, reference numeral 11 identifies an air cleaner, reference numeral 12 identifies a battery, reference numeral 13 identifies a fuel tank, and reference numeral 17 identifies a seat.

The vehicle body frame 1 includes an upper frame 20 and a lower frame 21 which extend in the front-rear direction and are substantially parallel to each other on the upper and lower sides. A front down frame 22 is formed by bending a front portion of the upper frame 20 and extends forwardly downwards. A rear down frame 23 is formed by bending a rear portion of the upper frame and extends rearwardly downwards to pass on the rear side of the engine 5. The frames are connected together in a closed loop form in side view.

A rear portion of the lower frame 21 is bent in the vicinity of a lower end portion of the rear down frame 23 and extends upwardly rearwards to constitute a rear frame 24. A rear end portion is connected to intermediate portions in the front-rear direction of seat rails 25 extending substantially horizontally and rearwards from the vicinity of a joint portion between a rear end portion of the upper frame 20 and the rear down frame 23.

A rear portion of the seat rail 25 extends further from the portion of connection with an upper end portion of the rear frame 24 and is bent downwards in a skewed manner to constitute an overhang portion 26. The overhang portion 26 is connected to the rear end of a lower arm support pipe 27 through a vertical pipe 28. The lower arm support pipe 27 extends rearward from the vicinity of a bent portion between a rear portion of the lower frame 21 and the rear frame 24. A rear end portion of the lower arm support pipe 27 is bent upwards to be connected to the vertical pipe 28.

An upper arm support pipe 29 is connectedly interposed between a connection portion between the vertical pipe 28 and the overhang portion 26 and an intermediate portion in the vertical direction of the rear frame 24, and is disposed on the upper side of and substantially in parallel to the lower arm support pipe 27. The upper arm support pipe 29 and the lower arm support pipe 27 support a rear wheel suspension arm member of the double wishbone system. For this purpose, the lower arm support pipe 27 is provided with stays 27a, 27b, and the upper arm support pipe 29 is provided with stays 29a, 29b.

A final case 30 constituting the transmission system is supported between the lower arm support pipes 27 and the upper arm support pipes 29. A rear wheel axle 31 extends to the left and right from the final case 30, and is connected to the rear wheels 3 at the tip ends thereof. Reference numeral 32 identifies a rear cushion or shock absorber in the rear wheel suspension.

Figure 2:
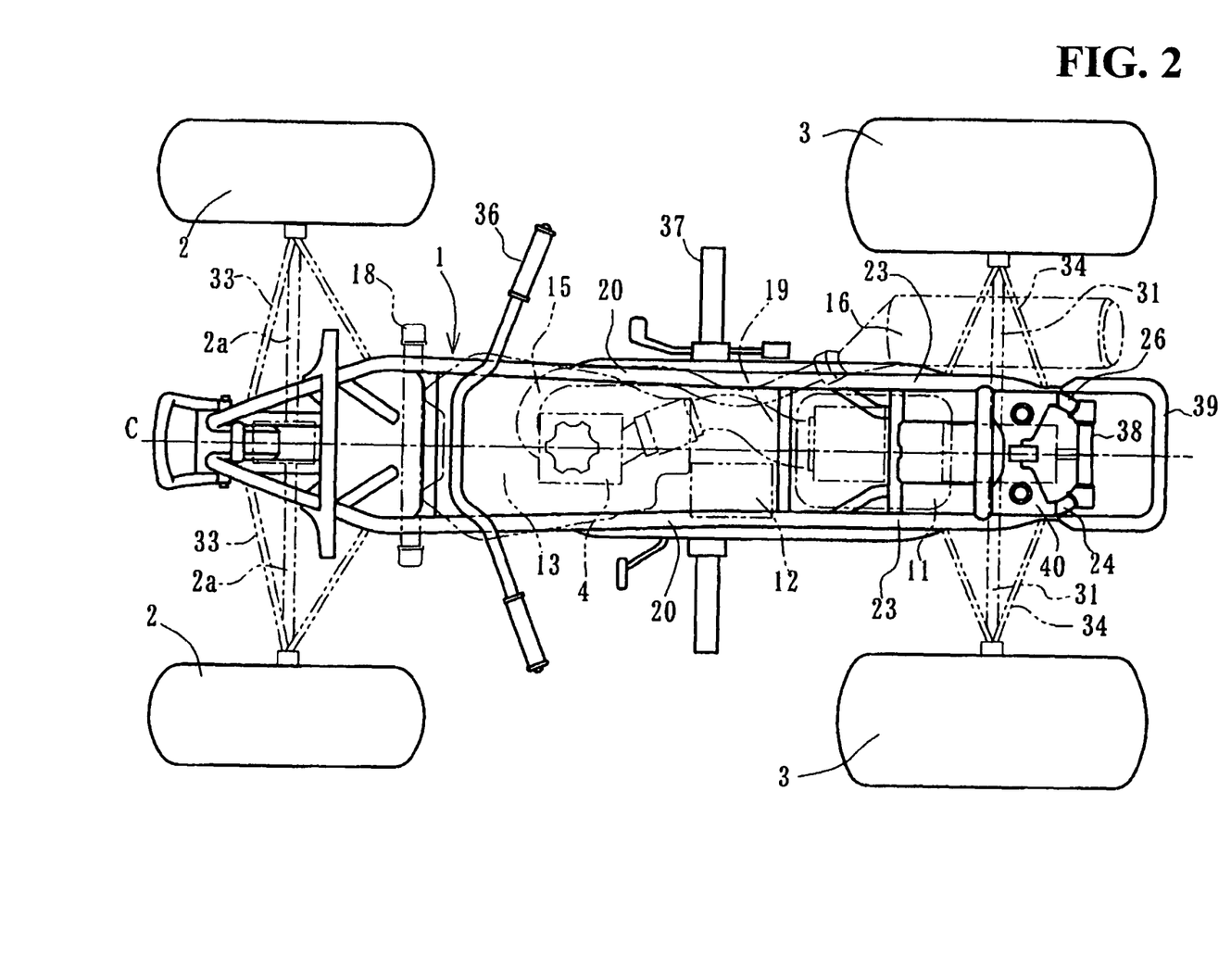
FIG. 2 is a plan view of the same.

FIG. 2 is a plan view of the vehicle body frame 1. The front wheels 2 are provided with a front wheel suspension of the double wishbone system. Reference numeral 33 identifies an upper arm in the front wheel suspension, and reference numeral 2a identifies a front wheel axle. Reference numeral 31 identifies the rear wheel axle, and reference numeral 34 identifies an upper arm in the rear wheel suspension. These are all shown schematically. The upper arms 33 and 34 are of the upper-side ones of upper and lower suspension arms provided in the double wishbone type suspensions, and the lower arms on the lower side are omitted in the figure. The front wheels 2 and the rear wheels 3 on the front and rear sides are independently suspended respectively on the left and right sides of the vehicle body.

The configurations in side view of the vehicle body frame 1 described referring to FIG. 1 are provided in a pair of left and right portions, with the vehicle body center C therebetween. The left and right portions are connected to each other by a plurality of cross members, and are integrated wholly. The members constituting the vehicle body frame 1 are composed of steel pipes or the like. Reference numeral 36 identifies a steering handle, reference numeral 37 identifies steps, reference numeral 38 identifies a cross pipe connecting lower end portions of the left and right overhang portions, and reference numeral 39 identifies a carry pipe.

Figure 3:
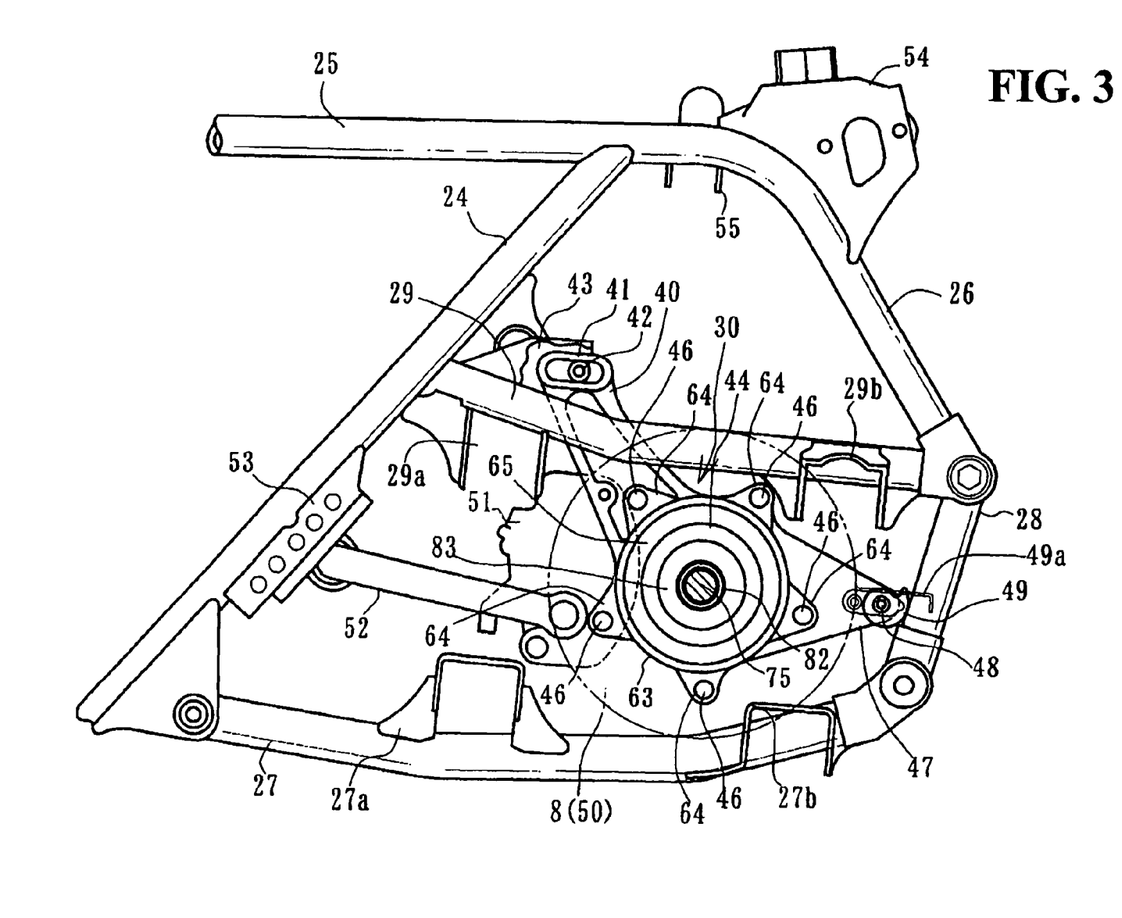
FIG. 3 is an enlarged side view of a rear portion of a vehicle body.

FIG. 3 is an enlarged side view of a rear portion of the vehicle body frame. The final case 30 is laid out between the left and right upper arm support pipes 29 and lower arm support pipes 27. A front-side mounting arm 40 extends upwards in a skewed manner at a front upper portion of the final case 30. The front-side mounting arm 40 is supported on a bracket 43 provided at a front end portion of the upper arm support pipe 29 by a support shaft 42 passed through a slot formed in tip end boss 41 thereof so that the support position can be adjusted in the front-rear direction.

A separate holder 63 for holding a bearing 65 for bearing an outer race of a left-side joint, which will be described later, is detachably mounted onto a left side surface of the final case 30 through mounting bosses 64 by bolts 46. The mounting bosses 64 project to an outer peripheral portion of the separate holder 63. In this embodiment, the mounting bosses 64 are provided at regular intervals along the circumferential direction so as to constitute vertexes of a regular pentagon. The final case 30 is also provided with mounting bosses that overlap with the mounting bosses 64.

A bearing holder 44 that is smaller in diameter than the separate holder 63 is provided at a central portion of the final case 30 coaxially with the separate holder 63, and is seen on the inner circumference side of the separate holder 63. A bearing 83 supported by the bearing holder 44 bears a joint portion shaft 82 of the right joint. The joint portion shaft 82 is tubular in shape. A rod-like joint portion shaft 75 of a left-side joint is fitted in the inside of the joint portion shaft 82.

A rear-side mounting arm 47 projecting outward from the bearing holder 44 is formed at a rear portion of the final case 30, and the tip end thereof is connected to a cam-type adjustor 49 through a support shaft 48. The cam-type adjustor 49 is turnably supported on the vertical pipe 28 through a stay 49a. By turning the cam-type adjuster, the position of the support shaft 48 is adjusted in the front-rear direction, whereby the tension of the chain 9 is changed. In this manner, the cam-type adjustor 49 functions as a chain adjustor.

Reference numeral 50 identifies a brake disk having substantially the same diameter as and overlapping with the driven sprocket 8 and coaxially supported on the right side of the final case 30, and is braked by a brake caliper 51. The stays 27b and 29b constituting a part of the support portion of the suspension arm overlap with the driven sprocket 8 and the brake disk 50 from the outer side in side view, and partly cover the driven sprocket 8 and the brake disk 50.

Reference numeral 53 identifies a bracket provided on the rear frame 24, and supporting the front end of a stabilizer 52. Reference numeral 54 identifies a carrier support bracket, while reference numeral 55 identifies a bracket for supporting the upper end of the rear cushion 32, and these brackets are provided at a boundary portion between the seat rail 25 and the overhang portion 26.

Figure 4:
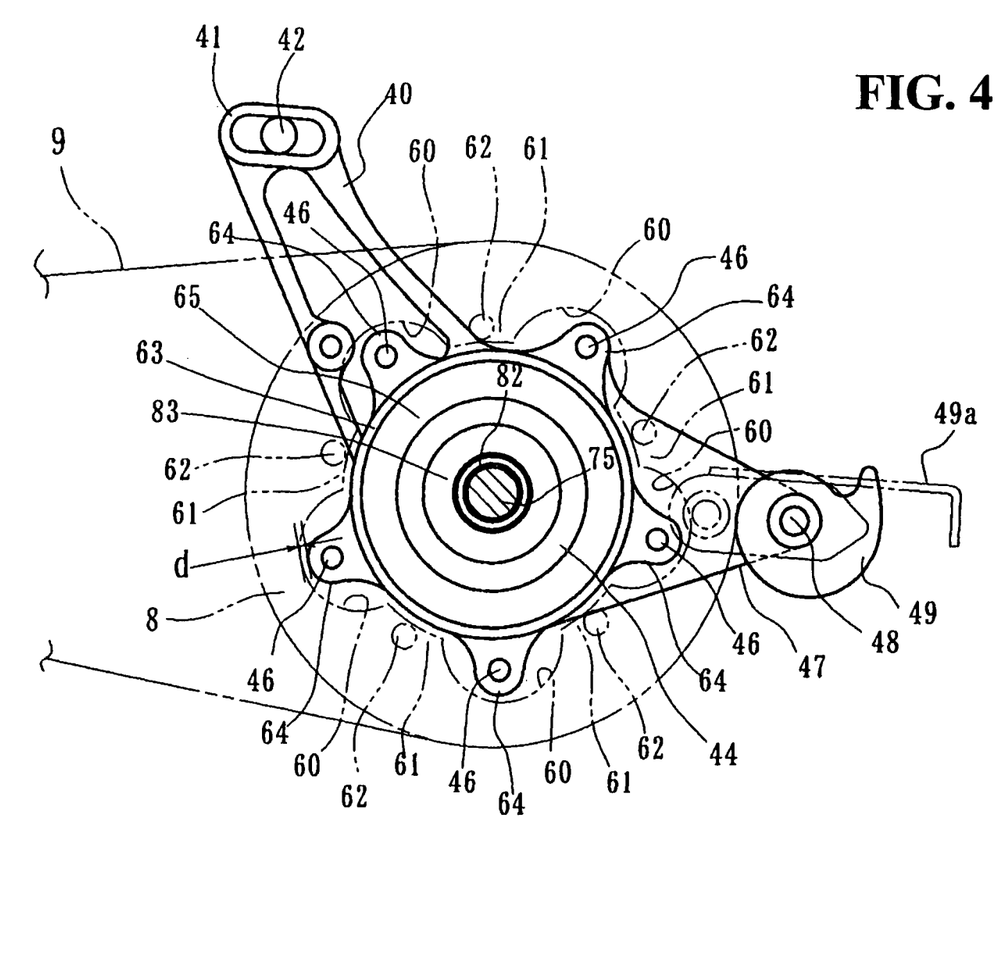
FIG. 4 shows the relationship between a separate holder and a driven sprocket.

FIG. 4 shows the relationship between the driven sprocket 8 and the final case 30. The driven sprocket 8 is substantially donut-like in shape. An inner peripheral portion of the driven sprocket 8 is provided with roughly semi-circular cutouts 60 arranged at regular intervals in the circumferential direction and bent radially outwards. The spaces on the inner circumference side of the driven sprocket 8 are, as a whole, roughly flower-like in apparent shape.

The number of the cutouts 60 is equal to the number of the mounting bosses 64, and the cutouts 60 are formed at regular intervals. In this embodiment, the cutouts 60 are formed at positions corresponding to the vertex portions of a regular pentagon. In addition, the cutouts 60 are larger in size than the mounting bosses 64. The mounting boss 64 as a whole is accommodated on the inside of the cutout 60, with a gap d formed between a bottom portion of the cutout 60 and a peak portion of the mounting boss 64. The bolts 46 can be attached and detached through the cutouts 60.

The portion between the adjacent cutouts 60 constitutes a mounting portion 61 bulged to the center side, and the driven sprocket 8 is detachably mounted onto a mounting flange provided on a left-side joint (to be described later) through bolts 62 or the like.

In the embodiment shown, five cutouts 60 and five mounting portions 61 are formed alternately and continuously along the circumferential direction. An opening portion that is roughly a flower-like shape as a whole is formed at an inner circumference portion of the driven sprocket 8. The opening portion constituted of the cutouts 60 and the mounting portions 61 will be referred to a flower-like punched hole. In this case, each cutout 60 corresponds to a petal portion, and the five cutouts 60 form a roughly five-petal flower-like shape.

The inner circumference portions of the mounting portions 61 are located on a concentric circle. The concentric circle constitutes a minimum-diameter portion of the flower-like punched hole. The separate holder 63 as a whole is placed on the inside of the concentric circle in side view shown in the figure. The number of the petal portions (cutouts 60) and the number of the mounting boss portions 64 constituting fastening portions of the separate holder 63 are equal (five). The mounting bosses 64 are formed to be smaller than the cutouts 60. The mounting bosses 64 are contained in the inside of the cutouts 60.

Figure 5:
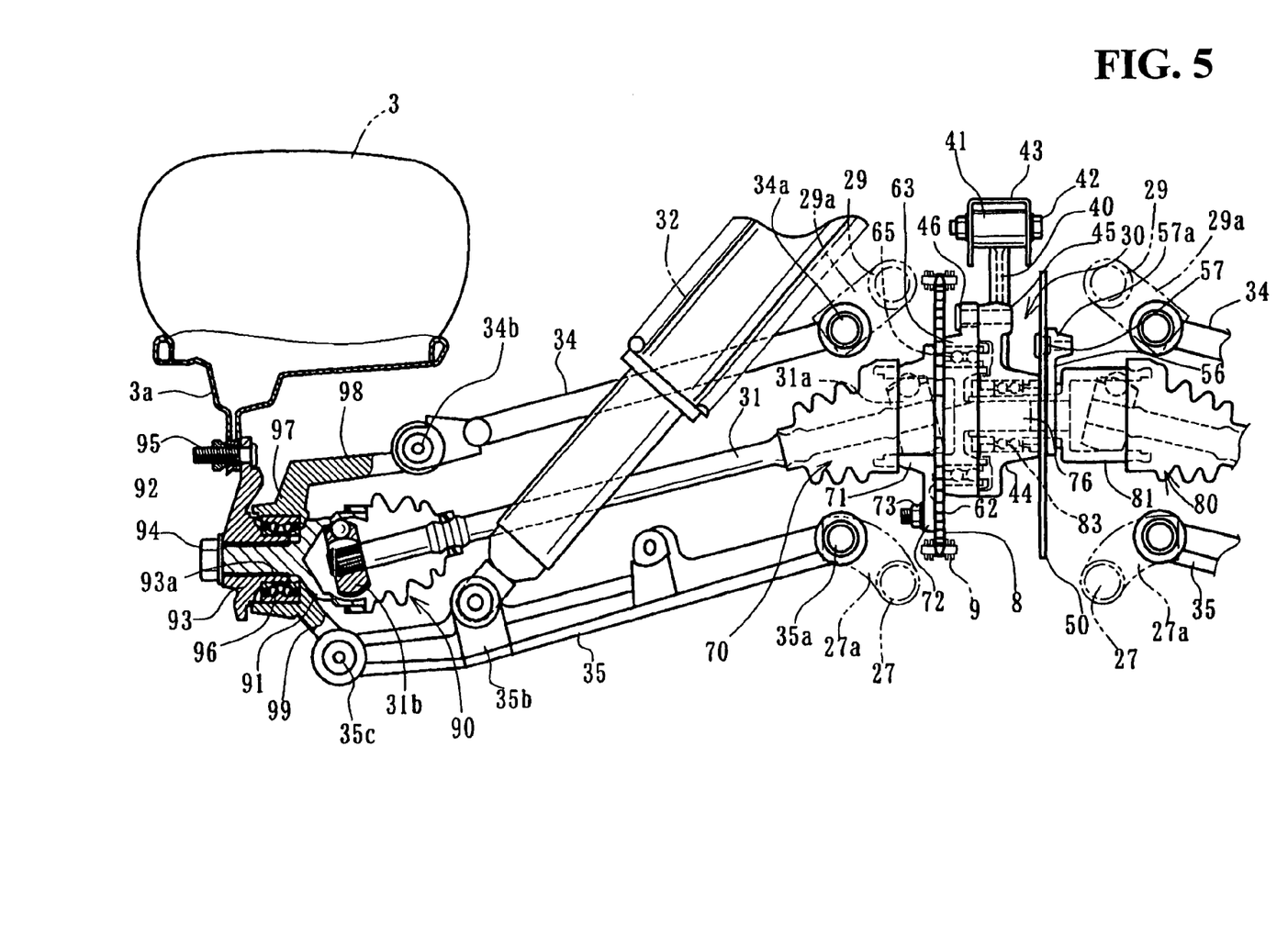
FIG. 5 shows a rear wheel suspension structure, as viewed from the rear side of the vehicle body.

FIG. 5 is a partly broken view of mainly a left-side rear wheel suspension structure, as viewed from the vehicle body rear side. The final case 30 rotatably supports a left-side joint 70 on a left side thereof through the separate holder 63. The driven sprocket 8 is attached, by bolts 62 and nuts 73, to the mounting flange 72 formed at an outer peripheral portion of the left-side joint 70.

A right-side joint 80 is rotatably supported on the right side of the final case 30, and, at the outer circumference thereof, the brake disk 50 is attached to a flange 57 of a flange member 56 rotated as one body with an outer race 81 which will be described later. The right-side joint 80 and the brake disk 50 are disposed coaxially with the left-side joint 70 and the driven sprocket 8.

An inner ring 31a formed at one end of the rear wheel axle 31 is fitted in the outer race 71 of the left-side joint 70, is rotated as one body with the left-side joint 70, and can be swung relative to the left-side joint 70. The rear wheel axle 31 extends downwardly outwards from the left-side joint 70, and the tip end thereof constitutes an inner ring 31b, which is connected to a rear wheel side joint 90.

A hub shaft 92 that projects outwards from the center of a cup-shaped outer race 91 accommodating the inner ring 31b of the rear wheel side joint 90 penetrates through the center of a hub 93 and spline connected to the latter, and the projected end thereof is so fixed as to be rotated as one body with the hub 93. An outer peripheral portion of the hub 93 is integrally united with a rim portion 3a of the rear wheel 3 by bolts 95.

The hub shaft 92 penetrates through the inside of a boss portion 93a formed at a central portion of the hub 93. A knuckle 97 is supported on an outer peripheral portion of the hub 93 through a bearing 96. An upper knuckle arm 98 and a lower knuckle arm 99 extending toward the inside of the vehicle body are integrally provided on the upper and lower sides of the knuckle 97.

The upper arm 34 and the lower arm 35 are roughly V shaped and are provided substantially in parallel to each other, on the upper and lower sides of the rear wheel axle 31. One end portion 34a on the vehicle body inner side of the upper arm 34 is swingably supported on the stays 29a, 29b (see FIG. 3) of the upper arm support pipe 29. The other end portion 34b on the vehicle body outer side of the upper arm 34 is connected to the upper knuckle arm 98 through a shaft.

One end portion 35a on the vehicle body inner side of the lower arm 35 is swingably supported on the stays 27a, 27b (see FIG. 3) of the lower arm support pipe 27. The lower arm 35 is provided with a mounting portion 35b at an intermediate portion thereof, where a lower end portion of the rear cushion 32 is connected through a shaft. The other end portion 35c on the vehicle body outer side of the lower arm 35 is connected to the lower knuckle arm 99 through a shaft.

With this configuration, the rear wheel 3 is driven by the rear wheel axle 31, and can be freely moved vertically, with a fulcrum at the one-side end portions 34a and 35a as a center. In this case, since the knuckle 97 and the upper arm 34 and the lower arm 35 constitute a parallelogram link mechanism, the rear wheel 3 is vertically moved in the manner of parallel motion.

The relationship between the rear wheel axle 31 and the rear wheel 3 and the structure of the upper arm 34 and the lower arm 35, on the vehicle body right side, are the same as on the vehicle body left side, so that detailed drawing and description of them are omitted. With this configuration, the left and right rear wheels 3 are independently suspended on the left and right sides of the vehicle body frame.

Figure 6:
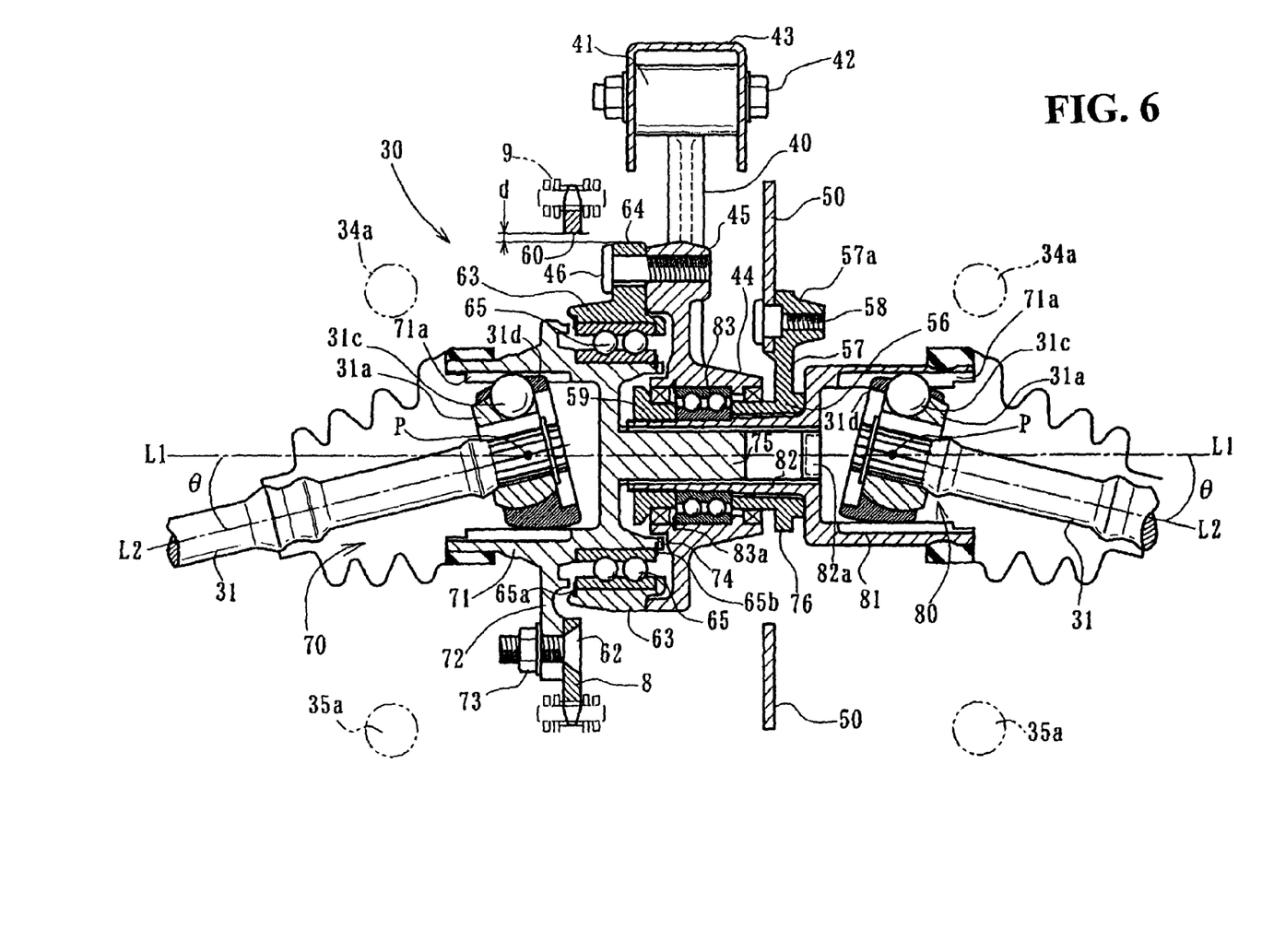
FIG. 6 is a cross sectional view of a final case and joints.

FIG. 6 shows a sectional structure, along the rear wheel axle 31, of the left-side joint 70 and the right-side joint 80 at the final case 30. The bearing holder 44 of the final case 30 is provided at its outer peripheral portion with bosses 45 at regular intervals. The boss portions 64 of the separate holder 63 overlap therewith and are attached thereto from a lateral side by the bolts 46.

The separate holder 63 is a member for supporting the bearing 65 for the left-side joint 70. A bearing portion 74 of the left-side joint 70 is fitted in and borne on the inner peripheral side of the separate holder 63 through the bearing 65. The bearing 65 is located on the bearing portion 74, and is positioned in a thrust direction by clips 65a and 65b. An outer race 71 projecting outwards continuously from the bearing portion 74 is provided in its inner peripheral surface with a serration groove 71a, in which balls 31c of the inner ring 31a are fitted. The balls 31c are aligned by a gage 31d. This joint structure constitutes a known equal-speed joint.

The driven sprocket 8 is laid on the mounting flange 72 projected radially outwards at an outer peripheral portion of the outer race 71, from the vehicle body inner side, and is integrally fastened to the mounting flange 72 by bolts 62 and nuts 73. Since the driven sprocket 8 is meshed with the chain 9, the driven sprocket 8 can be rotated relative to the separate holder 63 attached to the final case 30, through the bearing 65 by the drive of the chain 9.

At an axis portion of the outer race 71, a joint portion shaft 75 that is solid, round and rod-like in shape and formed with splines at its outside surface is integrally projected toward the vehicle body inner side, and is fitted in a shaft hole of a tubular joint portion shaft 82 formed with spline grooves in its inner peripheral surface. The spline connection permits rotation of the shafts. Since the joint portion shaft 75 is solid, round and rod-like and in a male form whereas the joint portion shaft 82 is tubular and in a female form, the joint portion shafts 75 and 82 are directly coupled with each other by female-male connection. Reference numeral 82a identifies a cap fitted in a shaft hole end portion of the joint portion shaft 82.

The bearing 83 is fitted on the inner peripheral side of the bearing holder 44 of the final case 30. The outer peripheral surface of the joint portion shaft 82 is borne by the bearing 83. Therefore, the outer races 71 and 81 are borne by the bearings 65 and 83, and are driven to rotate by the chain 9. The bearing 83 is positioned by a positioning portion provided in the bearing holder 44, and is prevented by a snap ring 83a from slipping off.

The joint portion shaft 82 is provided at its outer periphery with splines, to which a base portion of the flange member 56 is spline connected, and is externally fitted between a step portion of the outer race 81 and the bearing 83, so that the outer race 81 is positioned by the bearing 83. The outer periphery of the joint portion shaft 82 is provided with a male screw, to which a nut 59 is fastened. By tightening the nut 59, the outer race 81 and the bearing 83 are positioned and fixed.

A boss 57a is provided at the tip end of a flange portion 57 extending radially outwards of the flange member 56. An inner peripheral portion of the brake disk 50 is detachably attached to the boss 57a from the vehicle body inner side by a bolt 58. The brake disk 50 is disposed coaxially with the driven sprocket 8. The brake disk 50 and the driven sprocket 8 are separately disposed on the left and right sides of the final case 30. In addition, the driven sprocket 8 is supported by the left-side joint 70, while the brake disk 50 is supported by the right-side joint 80. Therefore, the driven sprocket 8 and the brake disk 50 are supported respectively by separate members.

The driven sprocket 8 and the brake disk 50 are located on the inside of one end 34a of the upper arm and one end 35a of the lower arm. Since the ends 34a and 35a are respective fulcrums on the vehicle frame side of the upper arm and the lower arm, they also show the positions in the vehicle width direction of the vehicle body frame, so that the driven sprocket 8 and the brake disk 50 are disposed on the inside of the vehicle body frame. Therefore, the vehicle body frame functions as a guard member for the driven sprocket 8 and the brake disk 50.

The joint angle θ of the rear wheel axle 31 is the angle formed between a horizontal line L1 and the axis L2 of the rear wheel axle 31. Therefore, where the wheel tread, i.e., the distance between the left and right rear wheels 3, 3 is constant and where the intersection between the lines L1 and L2 is referred to as a joint center P, the joint angle θ is smaller as the distance between the left and right joint centers P, P is smaller.

The operation of this embodiment will now be described. When the driven sprocket 8 is driven to rotate by the drive sprocket 7 of the engine 5 through the chain 9, the driven sprocket 8 drives the outer race 71 to rotate relative to the separate holder 63 attached to the final case 30, through the bearing 65. The left-side rear wheel axle 31 that is integrally rotatably meshed with the inside of the outer race 71 is driven to rotate.

Simultaneously, since the joint portion shaft 75 in a male form of the left-side joint 70 is spline connected to the joint portion shaft 82 in a female form of the right-side joint 80, and the joint portion shaft 82 is rotatably supported by the bearing 83 on the bearing holder 44 provided at the final case 30, the left and right outer races 71 and 81 are driven to rotate as one body, whereby the left and right rear wheel axles 31 are rotated at an equal speed.

With the configuration in which the outer races 71 and 81 are attached directly to each other by use of the joint portion shafts 75 and 82, the interposition of a tubular member as in the prior art is unnecessitated, so that the number of component parts can be reduced. In addition, the left-right width between the joint centers P, P can be reduced. Moreover, since the joint centers P are disposed on the inside relative to the vehicle body frame, the left-right width between the joint centers P-P can be further reduced.

Therefore, where the wheel tread is constant, the joint angle θ can be reduced according to the reduction possible in the left-right width between the joint centers P, P, and, accordingly, a sufficient wheel stroke can be secured.

In addition, in assembling the suspension system, the left-side joint 70 and the right-side joint 80 are preliminarily assembled separately from each other. Specifically, the left-side joint 70 is sub-assembled by fitting the bearing portion 74 of the left-side joint 70 into the inside of the bearing 65 in the separate holder 63. Similarly, the right-side joint 80 is sub-assembled by a method wherein the joint portion shaft 82 with the flange member 56 preliminarily fitted thereon is inserted into the inside of the bearing 83 on the bearing holder 44, and the tip end thereof is fixed by a fixing member 59.

The joint portion shaft 75 of the left-side joint 70 is fitted in the shaft hole in the joint portion shaft 82 by spline coupling. The mounting bosses 45 of the final case 30 and the mounting bosses 64 of the separate holder 63 are then laid on each other and are fastened to each other by the bolts 46, whereby the final case 30 portion can be assembled. In this case, since the left and right joint portion 75 and 82 are formed as a female-male couple and the left and right outer races 71 and 81 are connected by the fitting of the joint portion shafts, assembly is facilitated with ease. Also, the left and right outer races 71 and 81 can be connected assuredly. Therefore, mass-production of the power transmission structure can be accomplished. In addition, since the left and right outer races are disassembled by detaching the separate holder 63, maintenance is also enhanced. Moreover, since the separate holder 63 can be detachably attached to the final case 30 by the bolts 46, good assembly and mass-production can be attained.

In addition, the driven sprocket 8 is provided with the cutouts 60 which are petal-like in shape. The number of the cutouts 60 is set equal to the number of the mounting bosses 64. The cutouts 60 are formed to be larger than the mounting bosses 64. Therefore, the mounting bosses 64 of the separate holder 63 can be attached to and detached from the mounting bosses 45 of the final case 30 while keeping the condition where the driven sprocket 8 is attached to the outer race 71. Accordingly, attaching and detaching operations of the separate holder 63 can be carried out easily, and mass-production and maintenance are enhanced.

Incidentally, the present invention is not limited to the above embodiment, and various modifications are possible in the invention. For example, the cutouts 60 may not necessarily be petal-like in shape, and cutouts, recesses, holes and the like having various shapes can also be adopted inasmuch as they can form a working space through which the attaching and detaching operations can be smoothly carried out using a tightening tool.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power transmission structure comprising:
a transmission system final case supported on a vehicle body frame; and
left and right drive wheels supported by left and right suspension arms of said vehicle body frame,
wherein said final case is provided with left and right joints for transmitting a driving force of an engine to left and right axles, said left and right joints include respective outer races, one of said outer races is supported by a bearing in said final case, and the other outer race is supported by a bearing provided in a separate holder that is attachable and detachable from said final case, and
wherein the outer race that is supported by the bearing in the separate holder includes a male joint portion shaft and the outer race that is supported by the bearing in the final case includes a female joint portion shaft, and said male joint portion shaft is supported within the female joint portion shaft.

2. The power transmission structure as set forth in claim 1, wherein said separate holder includes an integrally formed attaching portion, said separate holder is detachably attached to said final case by a bolt.

3. The power transmission structure as set forth in claim 1, wherein one of said left and right outer races is provided with a driven sprocket, the other outer race is provided with a brake disk.

4. The power transmission structure as set forth in claim 3, wherein said driven sprocket is provided with a working space through which a fastening portion for detachably attaching said separate holder to said final case is exposed, when attached to said outer race.

5. The power transmission structure as set forth in claim 4, wherein said working space of said driven sprocket is a flower-like punched hole.

6. The power transmission structure as set forth in claim 5, wherein a number of petal-like portions of said flower-like punched hole is equal to a number of fastening portions for detachably attaching said separate holder to said final case, and said fastening portions are smaller than said petal-like portions.

7. The power transmission structure as set forth in claim 1, wherein the final case includes a bearing holder that holds the bearing that supports one of said outer races, said separate holder being mounted to said bearing holder.

8. A final case of a power transmission structure, comprising:
left and right joints for transmitting a driving force of an engine to left and right axles, said left and right joints including respective outer races, one of said outer races being supported by a bearing in said final case, and the other outer race is supported by a bearing provided in a separate holder that is attachable and detachable from said final case, and
wherein the outer race that is supported by the bearing in the separate holder includes a male joint portion shaft and the outer race that is supported by the bearing in the final case includes a female joint portion shaft, and said male joint portion shaft is supported within the female joint portion shaft.

9. The final case as set forth in claim 8, wherein said separate holder includes an integrally formed attaching portion, said separate holder is detachably attached to said final case by a bolt at said attaching portion.

10. The final case as set forth in claim 8, wherein one of said left and right outer races is provided with a driven sprocket, the other outer race is provided with a brake disk.

11. The final case as set forth in claim 10, wherein said driven sprocket is provided with a working space through which a fastening portion for detachably attaching said separate holder to said final case is exposed, when attached to said outer race.

12. The final case as set forth in claim 11, wherein said working space of said driven sprocket is a flower-like punched hole.

13. The final case as set forth in claim 12, wherein a number of petal-like portions of said flower-like punched hole is equal to a number of fastening portions for detachably attaching said separate holder to said final case, and said fastening portions are smaller than said petal-like portions.

14. The final case as set forth in claim 8, wherein the final case includes a bearing holder that holds the bearing that supports one of said outer races, said separate holder being mounted to said bearing holder.

* * * * *